United States Patent [19]

Elfes et al.

[11] 4,107,951
[45] Aug. 22, 1978

[54] COUPLING

[75] Inventors: Lee E. Elfes, Bloomfield Hills; Joseph W. Beckerman, Livonia, both of Mich.

[73] Assignee: Massey-Ferguson Inc., Detroit, Mich.

[21] Appl. No.: 712,978

[22] Filed: Aug. 9, 1976

[51] Int. Cl.$^2$ .................... F16D 3/12; F16D 3/64
[52] U.S. Cl. ...................... 64/14; 64/11 R; 64/27 NM
[58] Field of Search ............... 64/14, 11 R, 27 NM, 64/11 F

[56] References Cited

U.S. PATENT DOCUMENTS

| 472,707 | 4/1892 | Hunt | 64/14 |
|---|---|---|---|
| 2,326,451 | 4/1941 | Fawick | 64/11 F |
| 2,497,623 | 7/1946 | Nolen | 64/27 NM |
| 2,716,334 | 2/1951 | Scott | 64/27 NM |
| 3,396,556 | 9/1966 | Giegerich | 64/14 |
| 3,408,831 | 11/1968 | Schoeben | 64/27 NM |
| 3,552,145 | 7/1968 | Barton | 64/14 |
| 3,837,179 | 9/1974 | Barth | 64/27 NM |

Primary Examiner—Benjamin W. Wyche
Assistant Examiner—R. C. Turner
Attorney, Agent, or Firm—John C. Thompson

[57] ABSTRACT

A flexible coupling which permits both rotational and axial movement. An elastomeric member is sandwiched between two coupling members and is held in place in such a manner that the coupling members do not contact each other. Thus, each of the coupling members includes an elongated portion provided with projections which are received within cavities defined by radially extending fingers formed on the elastomeric member. The couplings are angularly offset 90° with respect to each other. Portions of the elastomeric member are held in compression between ends of the elongated portion and retainers by screw fasteners. The retainers and the screw fasteners associated with one coupling member do not contact the other coupling member.

10 Claims, 4 Drawing Figures

U.S. Patent   Aug. 22, 1978   4,107,951
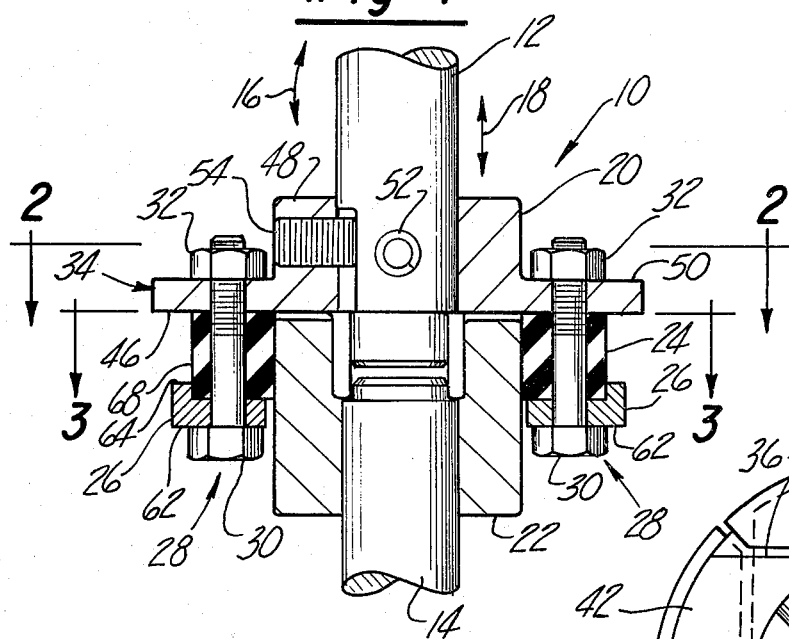
*Fig-1*
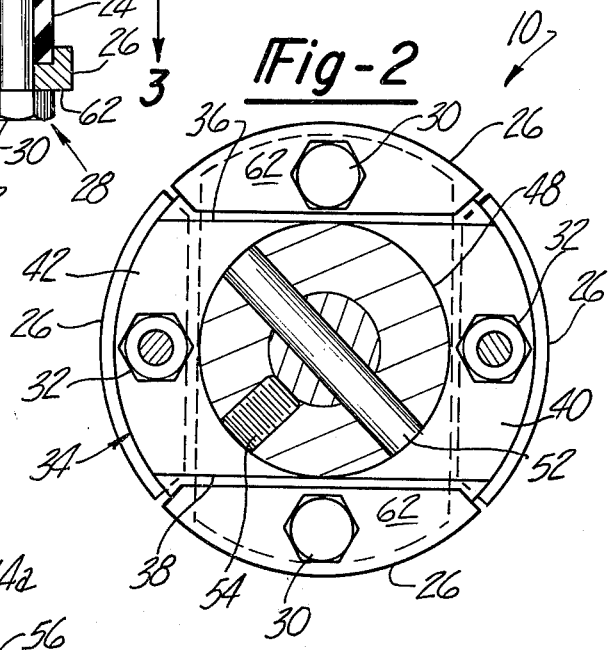
*Fig-2*
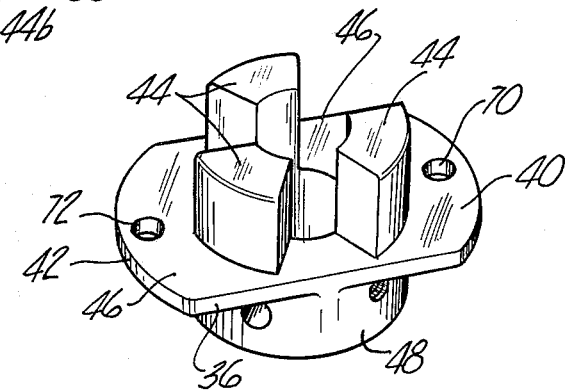
*Fig-3*
*Fig-4*

COUPLING

The present invention relates generally to a coupling, and more particularly to a flexible coupling capable of transmitting both axial and rotational movement between two shafts.

In recent years much progress has been made in reducing the noise in the passenger compartment of the vehicle, as for example a tractor cab mounted upon the frame of a tractor. This has been accomplished by mounting the cab on the frame in such a manner that virtually all metal to metal contact is eliminated and also by using improved acoustical materials within the cab. However, it is desirable to further reduce the noise level within the cab. One source of noise within the cab is through the controls which extend from the tractor cab to the frame of the vehicle. One such example is the gear shift column which must both rotate about its axis and shift longitudinally along its axis when shifting gears. In order to further reduce the noise levels within the cab it is desirable to interrupt the shafting by employing an elastomeric member which is disposed between adjacent ends of the shaft so that vibrations imparted to that end of the shafting which is connected to the tractor transmission is not imparted to controls and mounting structure within a tractor cab whereby the noise level within the cab may be reduced.

Therefore, it is an object of the present invention to provide an improved shaft coupling which is capable of transmitting both rotational movement and longitudinal movement about the axis of the shafting, the coupling including an elastomeric member and being so designed that metal to metal contact between adjacent ends of the shafting and associated coupling members is avoided.

The foregoing object and other objects and advantages of this invention are accomplished by providing first and second opposed coupling means each of which includes a plurality of spaced apart projections and an elongated portion which supports said projections, the elongated portion of the first coupling means being angularly offset with respect to the elongated portion of the second coupling means, an elastomeric member disposed between said first and second coupling means, the elastomeric member having a plurality of equally spaced apart radially extending fingers which define a plurality of adjacent first and second cavities, the first cavities receiving the projections of the first coupling means and the second cavities receiving the projections of the second coupling means, and a plurality of securing means to secure the first and second coupling means to the elastomeric member, each of said securing means holding a portion of the elastomeric member in compression between the securing means and an associated coupling means.

The foregoing structure will be described in greater detail with reference to the accompanying drawings in which a preferred form of this invention is illustrated.

FIG. 1 is a sectional view through a coupling of this invention.

FIG. 2 is a section taken generally along the line 2—2 in FIG. 1.

FIG. 3 is a section taken generally along the line 3—3 in FIG. 1.

FIG. 4 is an isometric view of one of the coupling means employed in this invention.

Referring first to FIG. 1 the coupling of this invention is indicated generally at 10, the coupling being adapted to interconnect two shafts 12 and 14 to each other for either rotational movement in the direction indicated by the arrow 16 or for movement about the axis of the shafts indicated by the arrow 18 without metal to metal contact. In summary the coupling includes first and second opposed coupling means 20, 22, an elastomeric member 24, and a plurality of securing means which are adapted to secure the first and second couplers to the elastomeric member, each of the securing means including a retainer 26 and fastening means indicated generally at 28, the fastening means in the embodiment illustrated being a bolt 30 and a nut 32.

Each of the coupling means 20, 22 may be substantially identical, or they could have forms different from each other. Thus, for example, the coupling means could be provided with different structures for securing each of the couplers to its associated shaft. In the embodiment illustrated each of the coupling means is substantially identical and like reference characters will be applied to like parts of each of the coupling means. Each coupling means includes an elongated plate-like portion indicated generally at 34, the portion having opposed sides 36, 38 (FIG. 2) which extend between the ends 40, 42. Three spaced apart projections 44 extend away from one surface 46 of the plate-like portion. A tubular portion 48 extends away from the other surface of the plate-like portion 34. The tubular portion 48 and the elongated plate-like portion 34 are provided with a common cylindrical aperture which receives one end of the associated shaft. Each shaft is secured in place by a pin 52 and a set screw 54 which are received in suitable apertures.

The elastomeric member 24 is best illustrated in FIG. 3 and in the preferred embodiment illustrated it has a generally cylindrical portion 56 and six equally spaced apart fingers 58 which extend radially inwardly from the inner wall 60 of the cylindrical portion. The fingers 58 and the inner wall 60 define a plurality of adjacent first and second cavities, each of which has a cross-sectional configuration substantially identical to the cross-sectional configuration of one of the projections 44. The projections of the first coupling means, which are indicated at 44a in FIG. 3, are received within the first cavities and the projections of the second coupling means, which are indicated at 44b in FIG. 3, are received in the second cavities.

The first and second coupling means, when in their assembled position shown in FIG. 1, are angularly offset with respect to each other by 90° which permit the projections 44a of the first coupling means to be received within the first cavities and the projections 44b of the second coupling means 22 to be received within the second cavities.

Each of the retainers 26 has a surface 62 generally in the form of a segment of a circle, and a lip portion 64 disposed along the circular edge of the segment. The inner surface 66 of the lip engages the outer wall 68 of the cylindrical portion of the elastomeric member when in the assembled position. When in the assembled position each retainer 26 is disposed adjacent one of the sides 36, 38 of an elongated portion and in this regard it should be noted that the elongated portion has a width less than the width of the generally cylindrical portion of the elastomeric member so that a pair of retainers can be disposed adjacent a surface of the elastomeric member and on opposite sides of the elongated member. As the first and second coupling means 20, 22 are offset 90° from each other bolts 30 may be passed through apertures 70, 72 in the end portions 40, 42 of the coupling means 20, through corresponding apertures in the elastomeric member, and through apertures in the retainers 26, there being one retainer associated with each of the bolts. The retainers are then secured in place by nuts 32, the nuts being tightened sufficiently to place the portion of the elastomeric member disposed between the retainer and the associated opposed end portion of the elongated member in compression.

By employing the structure described above the shafts 12 and 14 are rigidly interconnected to the elastomeric member 24 so that movement of one of the shafts in the directions indicated by the arrows 16, 18 will be transmitted to the other shaft. Thus, the shaft 12 is rigidly secured to the first coupler 20 and the first coupler is rigidly secured to the elastomeric member by retainers 28 which engage a portion of the elastomeric member opposite the ends 40, 42 of the elongated plate-like structure, the retainers being held in place by nuts and bolts 32, 30. In addition, the projection 44a engage the first cavities defined by the radially inwardly extending fingers 58 so that rotational movement of the shaft 12 will be imparted to the elastomeric member and the corresponding projections 44b on the other coupling means 22 without unduly stressing the elastomeric member. The other coupling means, which is rigidly secured to shaft 14, is connected to the member 24 in a like manner.

While a preferred structure in which the principles of the present invention have been incorporated is shown and described above, it is to be understood that the invention is not to be limited to the particular details, shown and described above, but that, in fact, widely differing means may be employed in the practice of the broader aspects of this invention.

What is claimed is:

1. A coupling comprising:
 first and second opposed coupling means each of which includes an elongated portion supporting a plurality of spaced apart projections;
 an elastomeric member disposed between the first and second coupling means, the elastomeric member having a plurality of equally spaced apart radially extending fingers which define a plurality of adjacent first and second cavities, the first cavities receiving the projections of the first coupling means and the second cavities receiving the projections of the second coupling means; and
 a plurality of securing means securing the first and second coupling means to the elastomeric member with the elongated portion of the first coupling means being angularly offset with respect to the elongated portion of the second coupling means, each of the securing means including a retainer in contact with one surface of the elastomeric member and spaced away from an adjacent side of the elongated portion of one of the coupling means, the elongated portion of the other coupling means contacting the other surface of the elastomeric member and cooperating with said retainer to confine a portion of the elastomeric member between said retainer and the elongated portion of the other coupling means, the parts being so arranged and constructed that the first and second coupling means do not come into contact with each other.

2. The coupling set forth in claim 1 wherein each of said securing means further includes fastening means passing through said retainer and one end of the elongated portion of the other coupling means.

3. The coupling set forth in claim 1 in which each of the first and second opposed coupling means is provided with a tubular portion adapted to be secured to a shaft, said tubular portion being disposed on a surface of the elongated portion opposite said spaced apart projections.

4. The coupling set forth in claim 3 in which the elongated portion is a generally plate-like member.

5. The coupling set forth in claim 1 wherein the elastomeric member has a generally cylindrical portion, the fingers extending radially inwardly from the inner wall of the cylindrical portion.

6. The coupling set forth in claim 5 wherein the retainer is in the form of a segment of a circle, the securing means further including fastening means adapted to pass through the retainer and one end of an elongated portion of the other coupling means to hold a segment of the cylindrical portion of the elastomeric member between the retainer and the end of the elongated portion of the other coupling means.

7. A coupling comprising:
 an elastomeric member having a generally cylindrical portion and a plurality of equally spaced apart fingers extending inwardly from the inner wall of the cylindrical portion, said fingers defining a plurality of adjacent first and second cavities;
 first and second opposed coupling means, each of which includes
  an elongated plate-like portion, the width between the sides of the elongated portion being less than the width of the generally cylindrical portion of the elastomeric member, and
  a plurality of spaced apart projections extending away from one surface of the plate-like portion.
 the plate-like elongated portion of the first coupling means being angularly offset with respect to the plate-like elongated portion of the second coupling means, the projections of the first coupling means being received in the first cavities defined by said fingers, and the projections of the second coupling means being received in the second cavities defined by said fingers;
 a plurality of retainers, each retainer being disposed adjacent a side of the elongated portion; and
 a plurality of fastener means extending through an end of an elongated portion, the elastomeric member, and a retainer to secure each of the first and second coupling means to the elastomeric member so that either axial movement or rotational movement of one coupling means will be imparted to the other coupling means without one coupling means being in contact with the other coupling means.

8. The coupling set forth in claim 7 wherein the elastomeric member is provided with six radially extending fingers, and each of said first and second opposed coupling means is provided with three spaced apart projections.

9. The coupling set forth in claim 7 wherein each of the coupling means is provided with a tubular portion adapted to be secured to a shaft, said tubular portion extending outwardly from the other surface of said plate-like portion.

10. The coupling set forth in claim 7 wherein each of the retainers has a surface in the form of a sector of a circle, the circular periphery of the retainers being provided with a lip the inner surface of which engages the outer wall of the elastomeric member.

* * * * *